UNITED STATES PATENT OFFICE 2,070,864

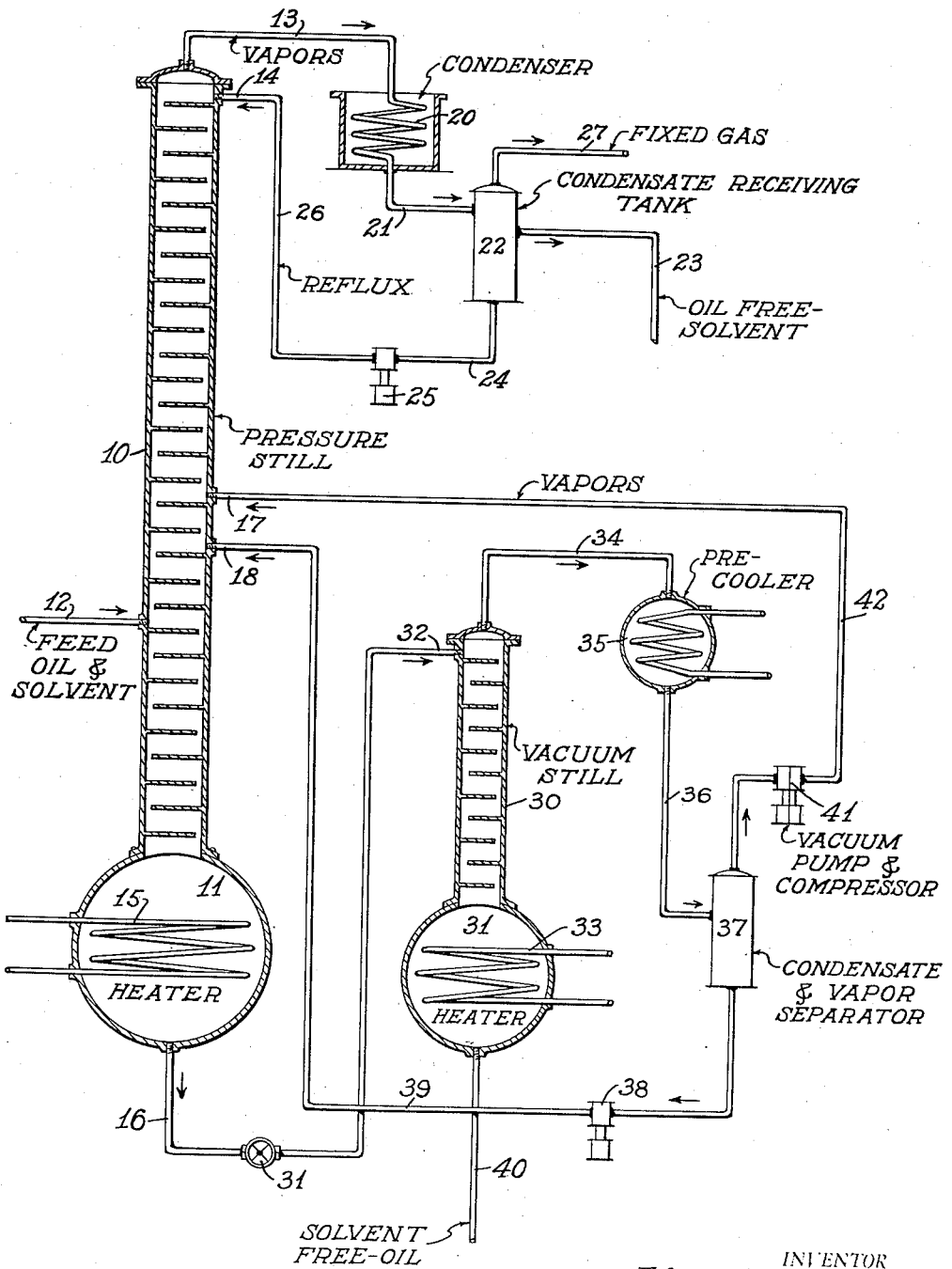

DISTILLATION

Edward G. Ragatz, Los Angeles, Calif., assignor to Union Oil Company of California, Los Angeles, Calif., a corporation of California Application October 19, 1933, Serial No. 694,300

3 Claims. (Cl. 202—39)

This invention relates to fractional distillation. The invention relates more particularly to the recovery of a solvent from solution in a hydrocarbon oil, by fractional distillation.

In many solvent extraction processes the relative boiling ranges of the oil and solvent are such that, at allowable distillation temperatures, a complete separation of the solvent and oil cannot be accomplished in a single still which is operated at the same time under sufficient pressure to condense the vaporized solvent at available cooling water temperatures. Consequently, under these conditions it is necessary to employ a two-stage process of distillation in which the first is a pressure distillation stage of limited temperature range, and the second a stage of distillation which is conducted at a pressure materially lower than the first.

If the relative boiling ranges of solvent and oil are such that no appreciable quantity of oil is vaporized in the low pressure distillation stage, the solvent vapors therefrom can be compressed and condensed in the solvent condenser of the pressure stage. However, in many cases the relative boiling ranges of solvent and oil are such that large amounts of oil are vaporized along with solvent in a low pressure stage and this results in a solvent condensate which is contaminated with appreciable quantities of oil even though the vapors leaving this stage are cooled previous to condensation. This condition can be overcome by introducing the vapors from the low pressure distillation stage into an intermediate point in the pressure distillation column.

Objects of this invention are therefore to provide a process and apparatus whereby complete separation of solvents and oils, having relatively close boiling ranges, can be accomplished; wherein neither the separated solvent nor oil will be contaminated with the other; wherein condensation of recovered solvent can be accomplished at available cooling temperatures, and wherein at the same time the highest temperatures employed in the distillation are well below those at which undesirable chemical actions begin to take place.

These objects are attained in general, according to the invention by providing a two-stage distillation system and process of operation thereof in which oil containing solvent is distilled in a first stage under sufficient pressure to make possible the condensation of all the vaporized solvent at the temperature of the available cooling water, followed by a second stage of distillation of the oil under pressure sufficiently low to vaporize all of the solvent from the said oil, and the return of the solvent vapors along with oil vapors from the said low pressure distillation stage to an intermediate point in the first pressure distillation stage and the withdrawal of the solvent-free oil from said low pressure distillation stage, and the withdrawal of oil-free solvent from the pressure condenser.

The invention broadly stated comprises a process and apparatus, for the recovery of solvent-free oil and oil-free solvent by distillation wheren the solvent-oil solution is subjected to a two-stage distillation process.

The invention more specifically resides in a process and apparatus for the recovery of solvent and oil from a solvent-oil solution, by two-stage distillation wherein the stages are operated at different pressures, and wherein the first stage is operated at a limited temperature and the same time at a pressure sufficient to allow condensation of the vaporized solvent at available cooling water temperatures and the second stage is operated at a pressure low enough to allow vaporization of all of the solvent remaining in the oil, and wherein the resultant vapors from the low pressure stage, which may contain vaporized oil, are introduced into the high pressure stage for further fractionation, separation, and final condensation under pressure in the pressure condenser, and wherein solvent-free oil is withdrawn from the low pressure stage still and oil-free solvent withdrawn from the high pressure condenser.

Other objects, advantages and features of the invention will be evident hereinafter.

The accompanying drawing illustrates one embodiment of the invention in which 10 is a pressure fractionating column in communication with a pressure still 11 and having an intermediate feed inlet connection 12, top vapor outlet connection 13, reflux return inlet connection 14, still heating element or coil 15, still bottoms outlet connection 16, intermediate vapor inlet connection 17, and intermediate condensate inlet 18. The top vapor outlet connection 13 leads to a pressure condenser 20, and line 21 conducts pressure condensate from the condenser to a condensate receiver 22. The reflux inlet 14 is connected to the condensate receiver through pipes 24 and 26. Pump 25 serves to withdraw condensate from receiver 20 through line 24 and to force it through line 26 to the said reflux inlet 14 to the pressure still.

A low pressure fractionating column 30 in communication with low pressure still 31 receives its feed through line 16, pressure reducing valve 31 and top feed inlet connection 32. A top vapor outlet 34 leads to a cooler 35 which is in turn connected through a vapor and condensate line 36 to a condensate and vapor-receiving and separating tank 37. The vapor space of tank 37 is connected to the pressure still vapor inlet connection 17, through vapor line 42, and compressor 41. The bottom liquid space of tank 37 is connected to the pressure still condensate inlet connection 18, through line 39 and pump 38.

Bottoms from the low pressure still 31 are withdrawn through the outlet connection 40. Pressure condensate is withdrawn from the condensate receiver 22 through line 23.

The operation is as follows:

A solution of oil and solvent is introduced into the pressure fractionating column 10 through the feed inlet connection 12 and passed down through the lower portion of the column in countercurrent contact with upward rising heated vapors from the heated bottoms in still 11. Heat is supplied to the still 11 through suitable heating means such as heating coils 15 through which a fluid at high temperature may be circulated. The vapors stripped from the oil-solvent feed in the lower portion of the column together with the vapors from the still continue upward through column 10, are fractionated therein in countercurrent contact with downward flowing reflux condensate and finally the fractionated solvent vapor is withdrawn through vapor outlet connection 13 and cooled and condensed in pressure condenser 20. The pressure condensate passes from the condenser 20 through line 21 into condensate receiver 22 where separation of condensate and fixed gases takes place and from where, through line 23, the oil-free solvent condensate is withdrawn. A portion of the solvent condensate from tank 22 is returned to the column for reflux by means of pump 25 through lines 24 and 26 and inlet 14. Fixed gases may be vented through line 27.

Pressure still bottoms from which a major portion of the solvent has been vaporized but which still retains remnants of solvent, owing to the impossibility of vaporizing all of it at the operating temperature and pressure therein, is withdrawn from still 11 through bottoms outlet 16 and flows, due to the pressure differential between the stills, through pressure reducing valve 31 and line 32 into the top of the low pressure fractionating column 30. The oil containing solvent is stripped, at reduced pressure in column 30, of the remaining remnants of solvent by countercurrent contact with rising heated oil vapors from still 31. Heat is supplied to still 31 by suitable heating means such as a heating coil 33 through which a suitable heating fluid may be circulated.

At the reduced pressure of operation in the column 30 and still 31 all of the solvent is vaporized and stripped from the oil in the still bottoms, but under this condition of operation with many solutions of solvent and oil, a portion of the oil is also vaporized and is carried overhead with the solvent vapors to the condenser. Thus, the solvent vapors containing oil vapors are withdrawn through vapor line 34 and cooled and partially condensed in cooler 35 in indirect heat exchange with a suitable cooling medium. The condensate and vapors pass from the cooler 35 through line 36 into the condensate and vapor separator 37. The condensate and vapors received in the separator 37 each contain both oil and solvent and these may be returned to the pressure stage for refractionation. The condensate is withdrawn from the bottom of separator 37 and returned by means of pump 38 through line 39 and inlet connection 18 into an intermediate portion of the pressure fractionating column 10. The vapors are removed from the top of the separator 37 and compressed by compressor 42 and returned through line 42 and inlet 17 to an intermediate portion of the said pressure fractionating column.

The condensate and vapors from separator 37 may be returned together through a single return line by employing a pump capable of handling both liquids and vapors at the same time, or when employing such a pump the condensate and vapors may be returned directly from the cooler 35 to the pressure fractionating column 10.

The condensate and vapors containing oil and solvent are thus returned to the pressure fractionating stage 10 where they are refractionated and the solvent vapors finally separated and condensed in the pressure condenser 20.

Solvent-free oil is withdrawn from the bottom of the vacuum still 31 through line 40.

The fractionating columns illustrated at 10 and 30 are of the conventional type employing perforated or bubble fractionating trays.

A typical example of operation according to the invention may be outlined as follows:

A solution of gasoline and sulphur dioxide as obtained in the Edeleanu solvent process of treating, is introduced either cold or with some preheating, into the pressure fractionating column. The gasoline may be ordinary motor fuel and have an initial boiling point of 400° F. at 71 lbs. per square inch absolute and the pure sulphur dioxide will have a vapor pressure of 71 lbs. per square inch absolute at 90° F. The pressure of operation in the pressure fractionating column and still may then be maintained at 71 lbs. per square inch absolute and condensation of practically pure sulphur dioxide accomplished in the pressure condenser 20 with a cooling water temperature slightly below 90° F. The solvent-oil solution and reflux condensate entering the still 11 could be stripped of all the solvent and a solvent-free oil obtained therefrom by maintaining a temperature there of 400° F. But this is undesirable for a number of reasons, chief among them being the tendency of the constituents undergoing distillation at that temperature, to undergo undesirable chemical reaction with one another, and also the usual inconvenience of obtaining heating fluid at this high temperature.

Steam at about 225° F. may be conveniently and safely used to heat the said still 11 and under this condition at the still pressure of 71 lbs. per square inch absolute a bottoms of oil containing approximately four percent by volume, of liquid sulphur dioxide will be withdrawn therefrom.

The bottoms containing four percent liquid sulphur dioxide may then be introduced into the low pressure column 30 through line 16, valve 31 and inlet 32, and there stripped of the remaining liquid sulphur dioxide at a pressure of 6 inches vacuum at a still temperature of 225° F. At 6 inches vacuum and 225° F. the oil withdrawn from still 31 through line 40 will be practically solvent free.

The overhead vapors for the low pressure still withdrawn through line 34 will under these conditions contain oil vapors, and the resultant condensate and uncondensed vapors will contain both oil and sulphur dioxide. These will be returned, subsequent to recompression, to the pressure column for further fractionation as described hereinbefore.

The foregoing is merely illustrative of one apparatus and process and the invention is not to be limited thereby but may include any process and apparatus which accomplishes the same within the scope of the invention.

I claim:

1. A process for making a sharp separation between high and low vapor pressure components of a feed mixture where their complete separation cannot be accomplished at a single pressure due to heater and condenser temperature limitations, comprising fractionally distilling the feed mixture in a high pressure stage under pressure sufficient to allow condensation of the substantially pure high vapor pressure overhead component at normal cooling water temperatures and producing a low vapor pressure bottoms component containing a sufficient quantity of the residual high vapor pressure component in solution to develop the required condenser pressure, fractionally distilling said bottoms in a low pressure stage under pressure sufficiently reduced to strip the residual high vapor pressure component from the oil and to produce a low pressure stage component bottoms substantially free from the high vapor pressure component and an overhead stripping vapor mixture of the two components, condensing that portion of the said overhead stripping vapors which is condensible at normal cooling water temperatures, returning the resultant partial condensate to an intermediate stage in the high pressure fractionation stage, compressing and returning the uncondensed portion of the said low pressure overhead vapors to an intermediate stage in the high pressure fractionator and withdrawing from the high pressure fractionation stage an overhead high vapor pressure condensate substantially free from the low vapor pressure component and withdrawing a bottoms from the low pressure fractionation stage substantially free from the high vapor pressure component.

2. A process for making a sharp separation between high and low vapor pressure components of a feed mixture comprising fractionally distilling the feed mixture in a high pressure fractionating column under pressure sufficient to allow condensation of the substantially pure high vapor pressure overhead component at normal cooling water temperatures and producing a low vapor pressure bottoms component containing a sufficient quantity of the residual high vapor pressure component in solution to develop the required condenser pressure, fractionally distilling said bottoms in a low pressure stage under pressure sufficiently reduced to strip the residual high vapor pressure component from the oil and to produce a low pressure stage component bottoms substantially free from the high vapor pressure component and an overhead stripping vapor mixture of the two components, condensing that portion of the said overhead stripping vapors which is condensible at normal cooling water temperatures, returning the resultant partial condensate to an intermediate stage in the high pressure fractionating column, compressing and returning the uncondensed portion of the said low pressure overhead vapors to an intermediate stage in the high pressure fractionating column and withdrawing from the high pressure fractionating column an overhead high vapor pressure condensate substantially free from the low vapor pressure component and withdrawing a bottoms from the low pressure fractionation stage substantially free from the high pressure component.

3. A process for making a sharp separation of a high vapor pressure solvent and a low vapor pressure hydrocarbon oil from a feed mixture thereof comprising fractionally distilling the feed mixture in a high pressure fractionating column under pressure sufficient to allow condensation of the substantially pure high vapor pressure solvent overhead vapors at normal cooling water temperatures and producing a low vapor pressure hydrocarbon oil bottoms component containing a sufficient quantity of the residual high vapor pressure solvent in solution to develop the required condenser pressure, fractionally distilling said bottoms in a low pressure stage under pressure sufficiently reduced to strip the residual high vapor pressure solvent from the oil and to produce a low pressure stage hydrocarbon oil bottoms substantially free from the high vapor pressure solvent and an overhead stripping vapor mixture of hydrocarbon oil and solvent, condensing that portion of the said overhead stripping vapors which is condensible at normal cooling water temperatures, returning the resultant partial condensate to an intermediate stage in the high pressure fractionating column, compressing and returning the uncondensed portion of the said low pressure overhead vapors to an intermediate stage in the high pressure fractionating column and withdrawing from the high pressure fractionating column an overhead high vapor pressure solvent condensate substantially free from the low vapor pressure hydrocarbon oil and withdrawing a bottoms from the low pressure fractionating stage substantially free from the high vapor pressure solvent.

EDW. G. RAGATZ.